United States Patent
Xie et al.

(10) Patent No.: US 10,621,260 B2
(45) Date of Patent: Apr. 14, 2020

(54) METHOD AND DEVICE FOR RESTORING PAGES OF BROWSER

(71) Applicant: WANGSU SCIENCE & TECHNOLOGY CO., LTD., Shanghai (CN)

(72) Inventors: Qingfeng Xie, Shanghai (CN); Yunhui Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 84 days.

(21) Appl. No.: 15/748,044

(22) PCT Filed: Nov. 16, 2016

(86) PCT No.: PCT/CN2016/106050
§ 371 (c)(1),
(2) Date: Jan. 26, 2018

(87) PCT Pub. No.: WO2018/082119
PCT Pub. Date: May 11, 2018

(65) Prior Publication Data
US 2019/0018902 A1    Jan. 17, 2019

(30) Foreign Application Priority Data
Nov. 2, 2016 (CN) .......................... 2016 1 0943736

(51) Int. Cl.
G06F 15/16 (2006.01)
G06F 16/957 (2019.01)
(Continued)

(52) U.S. Cl.
CPC ...... G06F 16/9574 (2019.01); G06F 16/9024 (2019.01); G06F 16/955 (2019.01);
(Continued)

(58) Field of Classification Search
CPC ............ G06F 16/954; G06F 2209/544; G06F 16/9562; H04L 67/02; H04L 67/14;
(Continued)

(56) References Cited

U.S. PATENT DOCUMENTS 8,527,636 B2 * 9/2013 Heymann ............... H04L 29/06
709/227
8,635,254 B2 * 1/2014 Harvey ................... H04L 67/42
707/805
(Continued)

FOREIGN PATENT DOCUMENTS

CN 102591963 A 7/2012
CN 102902805 A 1/2013
(Continued)

OTHER PUBLICATIONS

The European Patent Office (EPO) The Extended European Search Report for 16920904.6, dated Sep. 5, 2018 8 Pages.
(Continued)

Primary Examiner — Chirag R Patel
(74) Attorney, Agent, or Firm — Anova Law Group, PLLC

(57) ABSTRACT

A method and a device for restoring pages of a browser are provided. The method includes: receiving, by a browser, a command to open page One; receiving, by the browser, a command to store script state (ScriptState) data of the page One, leave the page One, and open page Two; and receiving, by the browser, a command to store ScriptState data of the page Two, leave the page Two, re-open the page One, and restore running of script of the page One.

10 Claims, 4 Drawing Sheets

(51) Int. Cl.
  *G06F 16/958* (2019.01)
  *H04L 29/08* (2006.01)
  *G06F 16/955* (2019.01)
  *G06F 16/901* (2019.01)

(52) U.S. Cl.
  CPC ............ *G06F 16/958* (2019.01); *H04L 67/02* (2013.01); *H04L 67/14* (2013.01)

(58) Field of Classification Search
  CPC ............... H04L 29/0809; H04L 67/025; H04L 67/2842; H04L 67/142; H04L 12/2803
  See application file for complete search history.

(56) References Cited

U.S. PATENT DOCUMENTS

2004/0003351 A1* 1/2004 Sommerer ............ G06F 16/955
  715/251
2006/0064482 A1* 3/2006 Nybo .................. G06F 16/9574
  709/224

FOREIGN PATENT DOCUMENTS

| | | |
|---|---|---|
| CN | 103699595 A | 4/2014 |
| CN | 104050253 A | 9/2014 |
| CN | 105320687 A | 2/2016 |
| EP | 1353270 A2 * | 10/2003 ........... H04L 67/142 |

OTHER PUBLICATIONS

Anonymous Manipulating the browser history Nov. 1, 2016 XP055502669 5 pages.
Anonymous Working with BFCache Oct. 9, 2014 XP055502663 2 pages.

* cited by examiner

METHOD AND DEVICE FOR RESTORING PAGES OF BROWSER

FIELD OF THE DISCLOSURE

The present disclosure relates to the field of computers and, more particularly, relates to a method and a device for restoring pages of a browser.

BACKGROUND

Currently, as the people using smart phones keep increasing, the wifi coverage range is being expanded and the mobile network is continuously accelerated. Browsing webpages through a mobile browser to acquire information has become a part of people's daily life. With the popularization of HTML5, the experience of mobile browsers has been continuously improved, and the usage frequency of the mobile browsers is becoming higher and higher.

However, existing browsers based on the CrossWalk kernel show the following drawbacks: the caching mechanism of the browser based on the CrossWalk kernel is merely to cache the image resources of webpage but not to cache the main resources and the javascript scripts. Thus, when the user clicks the back or forward button during the browsing process, the main resources of the webpage need to be re-loaded and parsed, and the javascript scripts also need to be re-loaded and parsed, which affects the displaying speed of the webpage. Further, the issue of jumping back to the beginning of the webpage instead of displaying the location that the user previously browses may even occur, which largely affect the user experience. However, if the main resources are cached but the javascript scripts are not correspondingly cached, for certain webpages including the javascript scripts, issues such as missing of certain webpage events may occur.

BRIEF SUMMARY OF THE DISCLOSURE

To solve issues in existing technologies, embodiments of the present disclosure provides a method and a device for restoring pages of a browser. The technical solutions are as follows.

On one hand, a method for restoring pages of a browser is provided, including the following steps:
receiving, by a browser, a command to open page One;
receiving, by the browser, a command to store script state (ScriptState) data of the page One, leave the page One, and open page Two; and
receiving, by the browser, a command to store ScriptState data of the page Two, leave the page Two, re-open the page One, and restore running of script of the page One.

Further, a step of receiving, by the browser, the command to store the ScriptState data of the page One, leave the page One, and open page Two specifically includes:
receiving, by the browser, a command to establish a linked list;
storing a Uniform Resource Locator (URL) and the ScriptState data of the page One in the linked list;
leaving, by the browser, the page One; and opening the page Two.

Further, a step of receiving, by the browser, the command to store the ScriptState data of the page Two, leave the page Two, re-open the page One, and restore running of the script of the page One specifically includes:

receiving, by the browser, a command to store a URL and ScriptState data of the page Two in the linked list that has already stored the URL and ScriptState data of the page One;
leaving, by the browser, the page Two, and re-opening, by the browser, the page One;
reading, by the browser, information in the linked list to search whether the URL of the page One is included;
if the URL of the page One is included, obtaining the ScriptState data of the page One, configuring the ScriptState data of the page One into the browser through a related interface; and restoring running of the script of the page One;
if the URL of the page One is not included, the linked list is known to include no ScriptState data of the page One, reloading, by the browser, the ScriptState data of the page One, parsing and running the script of the page One.

Optionally, the method for restoring a page of a browser further includes: when the number of pages opened by the browser exceeds a preset length of the linked list or the browser is exited, removing, by the linked list, a sign indicating that data has been cached, calling a released interface, and releasing the cached data.

On the other hand, a device for restoring pages of a browser is provided, including:
a page data storing module, configured to store a URL and ScriptState data of pages of a browser; and
a page data restoring module connected to the page data storing module, configured to restore the ScriptState data of the pages of the browser.

Further, the page data restoring module includes:
a page URL searching module connected to the page data storing module, configured to search whether the page data storing module includes a URL of a page to be restored;
a page ScriptState data restoring module connected to the page URL searching module, configured to restore ScriptState data of the page and restore running of the script.

Optionally, the device for restoring pages of a browser further includes a page data releasing module connected to the page data storing module, configured to release data stored in the page data storing module.

In another aspect, a browser is provided, including the aforementioned device for restoring pages of a browser.

In another aspect, an apparatus is provided, including the aforementioned browser.

Further, the apparatus includes: a cellphone, a tablet, a notebook, a desktop, an electronic reader, a game console, and a network set-top box.

The beneficial effects brought about by technical solutions provided by embodiments of the present disclosure are as follows. Directed primarily towards the issues such as the occurrence of missing of certain webpage events because most existing browsers only cache the webpage main resources but don't cache the javascript scripts correspondingly, the present disclosure provides a method to cache the content and state of javascript in a V8 engine of the browsers based on the CrossWalk kernel and to restore state. The disclosed method may effectively improve the restoring speed of the pages, prevent the missing of the webpage events, and improve the browsing experience of the user.

BRIEF DESCRIPTION OF THE DRAWINGS

To more clearly illustrate technical solutions in embodiments of the present disclosure, accompanying drawings to be used in the following embodiments will be introduced briefly. Obviously, the accompanying drawings described hereinafter are merely some embodiments of the present disclosure, and for those ordinarily skilled in the relevant art, other drawings may be derived from such drawings without contributing creative labor.

DETAILED DESCRIPTION

To more clearly describe the objectives, technical solutions and advantages of the present disclosure, implementations of the present disclosure is further illustrated in details with reference to the accompanying drawings in conjunction with embodiments.

Embodiment 1

Figure 1:
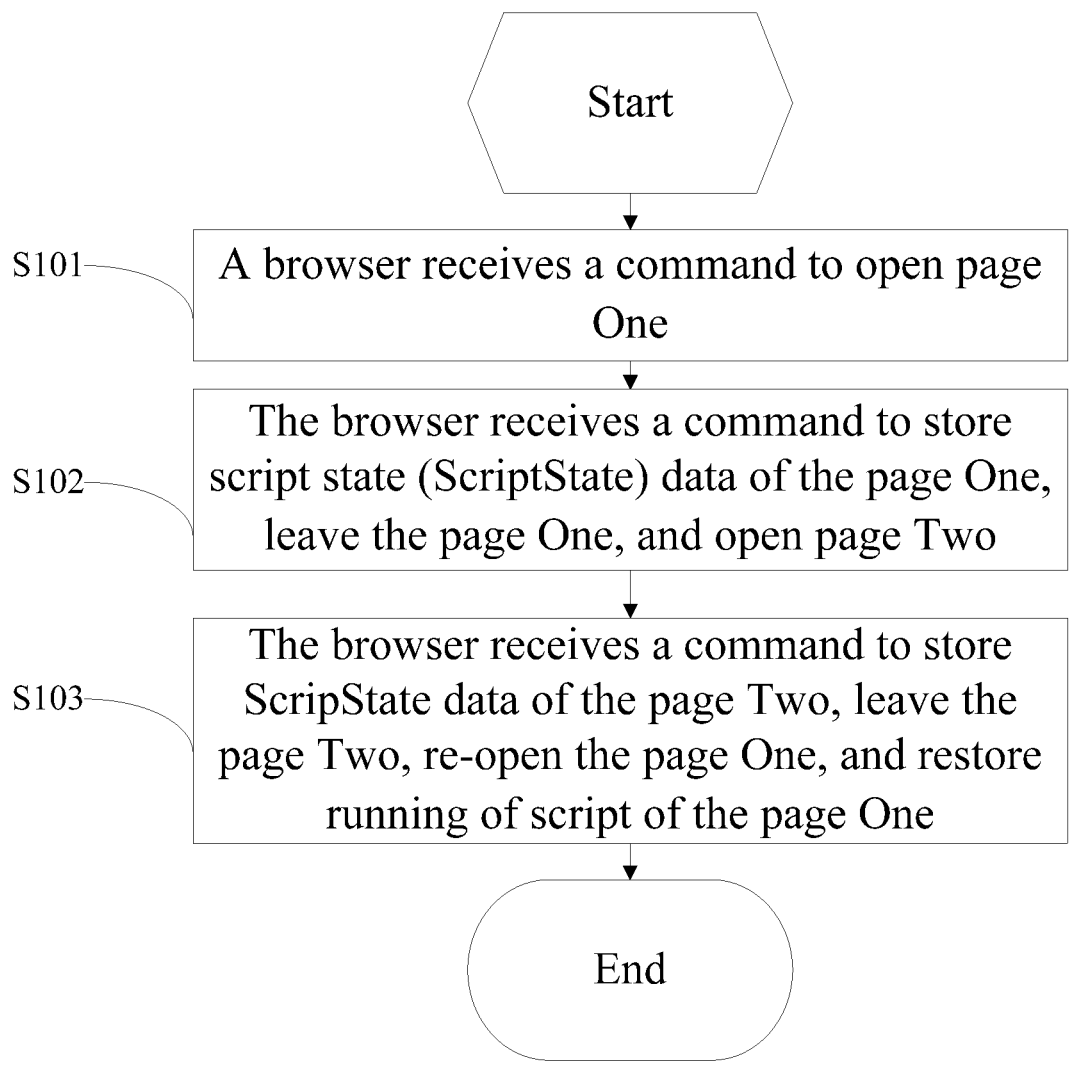
FIG. 1 illustrates a flow chart of a method for restoring pages of a browser according to Embodiment 1 of the present disclosure.

The present disclosure provides a method for restoring pages of a browser. As shown in FIG. 1, the following steps are included: first, step S101 is performed, where a browser receives a command to open page One; then, step S102 is performed, where the browser receives a command to store script state (ScriptState) data of the page One, leave the page One, and open a page Two; and further, step S103 is performed, where the browser receives a command to store ScripState data of the page Two, leave the page Two, re-open the page One, and restore running of script of the page One.

Figure 2:
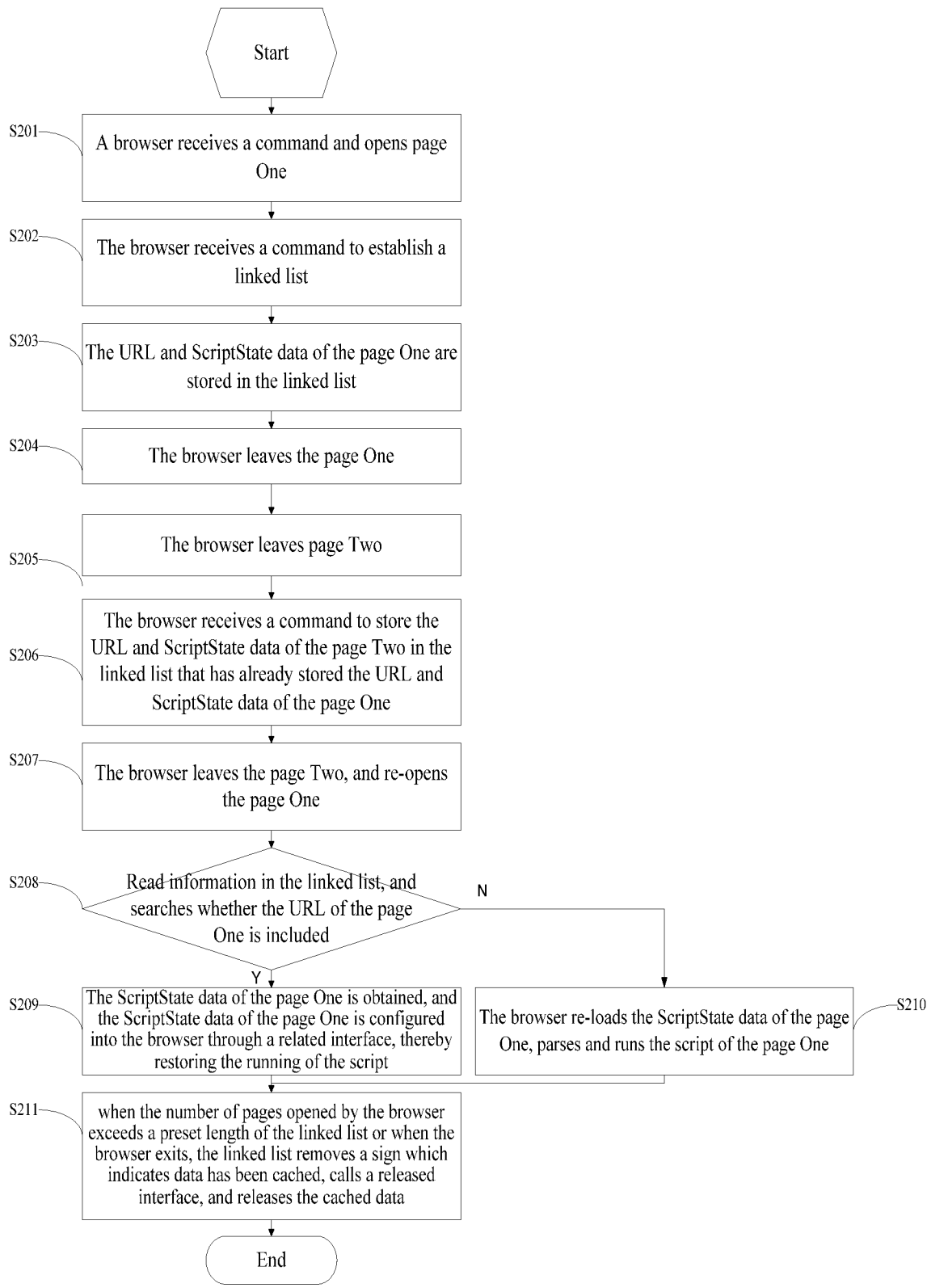
FIG. 2 illustrates another flow chart of a method for restoring pages of a browser according to Embodiment 1 of the present disclosure.

More specifically, as shown in FIG. 2:

At step S201, the browser receives a command to open the page One, and load page content such as image, link, and music;

At step S202, the browser receives a command to establish a linked list. The linked list is a non-continuous and non-sequential storage structure belonging to a physical storage unit, in which, the logic sequence of data elements is realized by the linked order of the pointers in the linked list. The linked list includes a series of nodes (each element in the linked list is called a "node"), and the nodes may be generated dynamically during running. Each node may include two parts: a data domain for storing a data element, and a pointer domain for storing an address of the next node. The linked list in the disclosed embodiments is established in the page cache (PageCache), and is configured to store the universal resource locator (URL) and ScriptState data of the page opened in the browser. The structure of the linked list includes a history item (HistoryItem) and a cached page (CachedPage);

At step S203, the URL and ScriptState data of the page One are stored in the linked list;

At step S204, the browser leaves the page One. In one embodiment, leaving the page One include the following two situations: (1) page Two opened from the page One, and the page Two is entered directed from the page One; (2) Close the page One At step S205, the browser opens the page Two, and loads page content such as the image, link, and music of the page Two.

At step S206, the browser receives a command to store the URL and ScriptState data of the page Two in the linked list that has already stored the URL and ScriptState data of the page One. If the browser continues to open page Three or more pages, the URL(s) and ScriptState data of such pages also need to be stored in the aforementioned linked list.

At step S207, the browser leaves the page Two, and re-opens the page One. In one embodiment, re-opening the page One includes the following two situations: (1) after the browser enters the page Two from the page One, a back command is received; (2) after the browser closes the page One, a command to re-open the page One is received.

At step S208, the browser reads information in the linked list, and searches whether the URL of the page One is included. When the browser re-opens the page One, whether the URL of the page One is included is searched in the aforementioned linked list. If the URL of the page One is included, it indicates that the linked list includes the ScriptState data of the page One, and step S209 is executed; if the URL of the page One is not included, the linked list includes no ScriptState data of the page One, and step S210 is executed.

At step S209, the ScriptState data of the page One is obtained, and the ScriptState data of the page One is configured into the browser through a related interface, thereby restoring the running of the script. Based on the URL of the page One, the corresponding ScriptState data of the page One is found in the linked list, and such data is configured into the browser through an "setSaveScriptState" interface, thereby restoring the running of the script of the page One. When the browser once again enters the page Two from the page One, the ScriptState data of the page Two may be similarly obtained by searching for the URL of the page Two in the linked list, and the ScriptState data of the page Two is configured into the browser through the "setSaveScriptState" interface, thereby restoring the running of the script of the page Two.

At step S210, the browser re-loads the ScriptState data of the page One, parses and runs the script of the page One.

The disclosed method may further include step S211, at which, when the number of pages opened by the browser exceeds a preset length of the linked list or when the browser exits, the linked list removes a sign which indicates data has been cached, calls a released interface, and releases the cached data.

The present disclosure provides a method to cache the content and state of javascript in a V8 engine of browsers based on the CrossWalk kernel, and to restore state. The disclosed method may effectively improve the restoring speed of the pages, prevent the missing of the webpage events, and improve the browsing experience of the user, when the user restores a previously viewed webpage.

Embodiment 2

Figure 3:
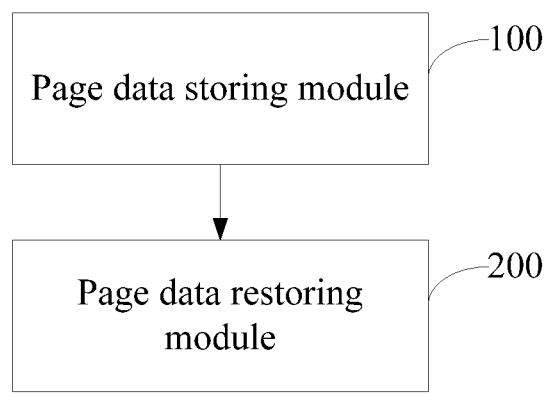
FIG. 3 illustrates a structural schematic view of a device for restoring pages of a browser according to Embodiment 2 of the present disclosure.

The present disclosure further provides a device for restoring pages of a browser, as shown in FIG. 3, the device includes a page data storing module 100 and a page data restoring module 200. The page data storing module 100 is configured to store a URL and ScriptState data of pages of a browser. The page data restoring module 200 is connected to the page data storing module 100, and is configured to restore the ScriptState data of the pages of the browser.

Figure 4:
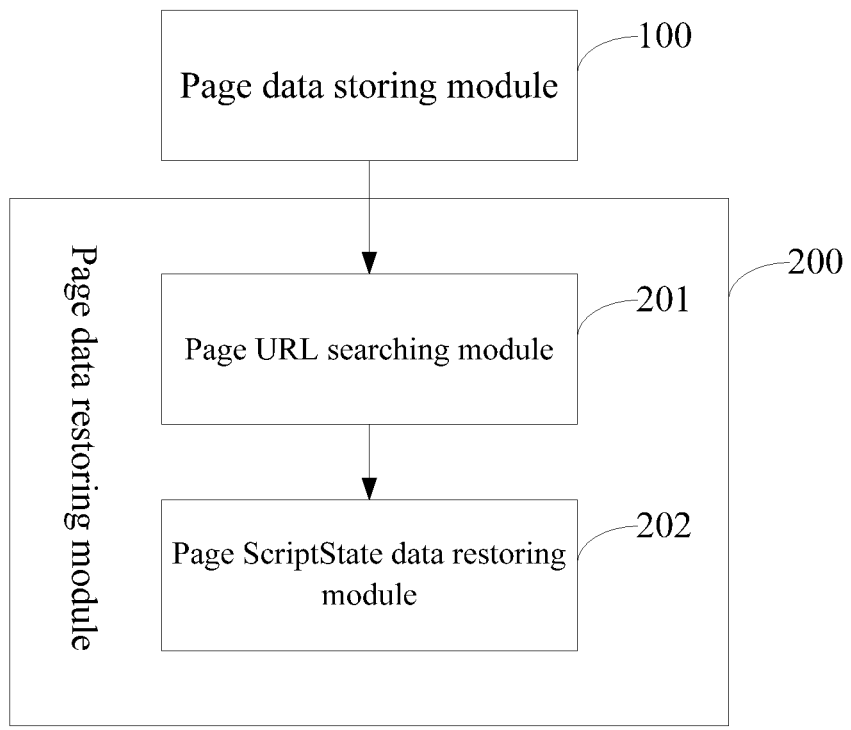
FIG. 4 illustrates a structural schematic view of a device for restoring pages of a browser according to Embodiment 2 of the present disclosure.

More specifically, as shown in FIG. 4, the page data storing module 100 may usually be a linked list, and when the browser opens a new page, the URL and the ScriptState data of the newly opened page may be saved in the linked list in a one-to-one correspondence.

The page data restoring module 200 includes: a page URL searching module 201 and a page ScriptState data restoring module 202.

The page URL searching module 201 is connected to the page data storing module 100, and is configured to search whether the page data storing module 100 includes a URL of a page to be restored. When the browser receives a forward, backward, or page-restoring command to re-open a previously opened page, the page URL searching module 201 searches whether the URL of the previously opened page is included in the page data storing module 100. If the page data storing module 100 includes the URL of the previously opened page, it means the page data storing module 100 includes the ScriptState data of the previously opened page. If the page data storing module 100 does not include the URL of the previously opened page, it means the page data storing module 100 does not include the ScriptState data of the previously opened page.

The page ScriptState data restoring module 202 is connected to the page URL searching module 201, and is configured to restore the ScriptState data of a page and restore running of the script. Through the results obtained by using the page URL searching module 201 to search the page data storing module 100, if the page data storing module 100 includes the ScriptState data of the page to be re-opened, the ScriptState data of the page to be re-opened may be called from the page data storing module 100. Further, through a related interface, the ScriptState data is configured into the browser, and the running of the script is restored. If the page data storing module 100 includes no ScriptState data of page to be re-opened, the browser re-establishes the ScriptState data of the page to be re-opened, and the running of the script is restored.

Figure 5:
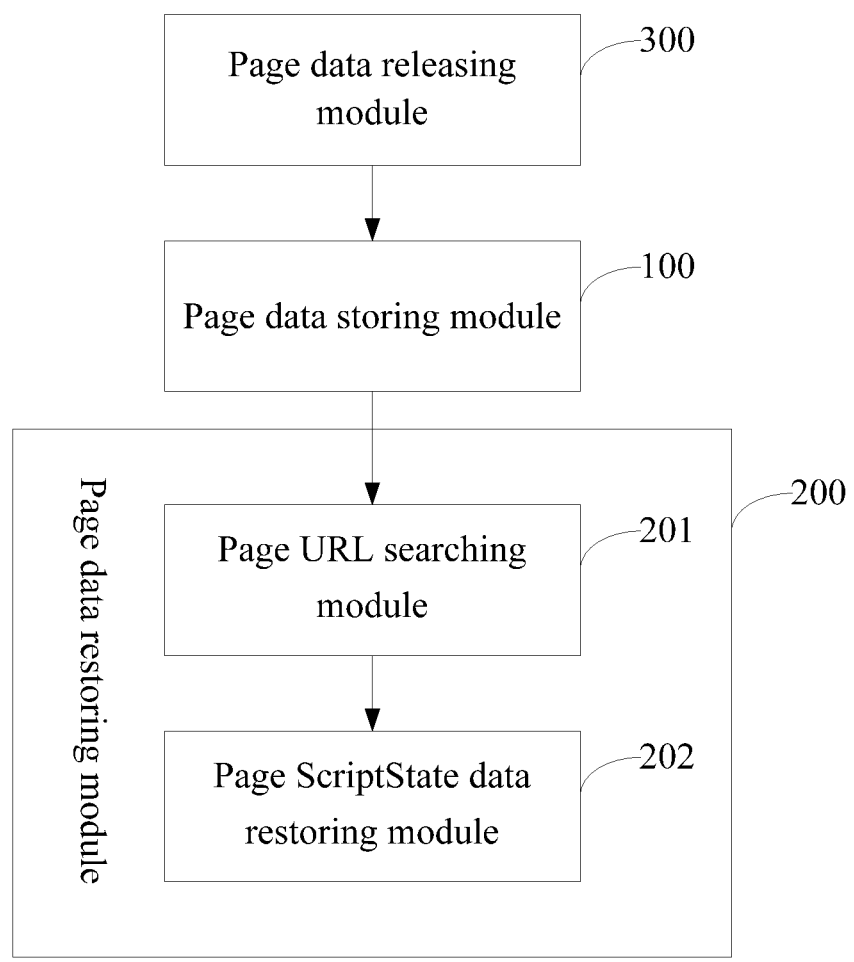
FIG. 5 illustrates a structural schematic view of a device for restoring pages of a browser according to Embodiment 2 of the present disclosure.

As shown in FIG. 5, optionally, the device for restoring pages of the browser may further include a page data releasing module 300. The page data releasing module 300 is connected to the page data storing module 100, and is configured to release data stored in the page data storing module 100. When the number of pages opened by the browser exceeds a preset length of the linked list or the browser is exited, the linked list releases stored data, removes a sign that data has been cached, calls a released interface, and releases the cached data.

Embodiment 3

The present disclosure further provides a browser, and the browser includes a device illustrated in FIG. 3. The disclosed browser may be a V8 engine based on CrossWalk kernel, or other browsers using the V8 engine, and the present disclosure is not limited thereto. The browser may cache the content and state of the javascript of the webpage when the webpage is closed, and restore the content and state of the javascript of the webpage when the webpage is re-opened. Accordingly, when the user restores a previously browsed page, the restoring speed of the pages may be effectively improved, the missing of the webpage events may be prevented, and the browsing experience of the user may be improved.

Embodiment 4

The present disclosure further provides an apparatus, and the apparatus may include a browser, where the browser includes a device shown in FIG. 3. In the present disclosure, the apparatus may be any one of a cellphone, a tablet, a notebook, a desktop, an electronic reader, a game console, or a network set-top box, etc. The present disclosure is not limited thereto.

The sequential numbers of the embodiments of the present disclosure are merely for descriptive purposes, which does not represent preferences of any embodiment.

The device embodiments described above are only for illustrative purposes. Units described as separated components may or may not be physically separated, and the components serving as display units may or may not be physical units. That is, the components may be located at one position or may be distributed over various network units. Some or all of the units may be selected to realize the purpose of solutions of embodiments herein according to practical needs. Without contributing any creative labor, those ordinarily skilled in the relevant art may understand and implement the aforementioned embodiments.

Through the foregoing description of the implementation manners, it is clear to those skilled in the relevant art that the present disclosure may be implemented by software plus a necessary universal hardware platform, and certainly may also be implemented by hardware, but in many cases, the software implementation is preferred. Based on such an understanding, the technical solutions of the present disclosure or the part that makes contributions to the existing technology may be substantially embodied in the form of a software product, and such computer software product may be stored in a computer-readable storage medium, such as a ROM/RAM, a magnetic disk, or an optical disc. The computer software product may include plural instructions configured to enable a computer apparatus (which may be a personal computer, a server, or a network device) to perform the method described in each embodiment or certain portions of the embodiments.

The foregoing is only preferred embodiment of the present disclosure, and is not intended to limit the present disclosure. Without departing from the spirit and principles of the present disclosure, any modifications, equivalent replacements and improvements shall all fall within the protection scope of the present disclosure.

What is claimed is:

1. A method for restoring pages of a browser, comprising:
   receiving, by the browser, a command to open page One;
   receiving, by the browser, a command to store script state (ScriptState) data of the page One, leave the page One, and open page Two; and
   receiving, by the browser, a command to store ScriptState data of the page Two, leave the page Two, re-open the page One, and restore running of script of the page One corresponding to the stored ScriptState data of the page One, wherein receiving, by the browser, the command to store the ScriptState data of the page Two comprises:
      receiving, by the browser, a command to store a URL and the ScriptState data of the page Two in a linked list that has already stored the URL and the ScriptState data of the page One;
      leaving, by the browser, the page Two;
      re-opening, by the browser, the page One;
      reading, by the browser, information in the linked list to search whether the URL of the page One is included;

if the URL of the page One is included, obtaining the ScriptState data of the page One, configuring the ScriptState data of the page One into the browser through a related interface; and restoring running of the script of the page One; and if the URL of the page One is not included, the linked list is known to include no ScriptState data of the page One, reloading, by the browser, the ScriptState data of the page One, parsing and running the script of the page One.

2. The method according to claim 1, wherein receiving, by the browser, the command to store the ScriptState data of the page One comprises:

receiving, by the browser, a command to establish the linked list;

storing the Uniform Resource Locator (URL) and the ScriptState data of the page One in the linked list;

leaving, by the browser, the page One; and opening, by the browser, the page Two.

3. The method according to claim 1, further comprising:

when the number of pages opened by the browser exceeds a preset length of the linked list or the browser has exited, removing, by the linked list, a sign indicating that data has been cached, calling, by the linked list, a released interface, and releasing, by the linked list, the cached data.

4. An apparatus, comprising:

a browser including a device for restoring pages of the browser, wherein when executed by a processor under computer programs stored in a memory, the device is configured to:

store a URL and ScriptState data of pages of the browser; and restore the ScriptState data of the pages of the browser and restore running of script corresponding to the restored ScriptState data of the pages, wherein receiving, by the browser, the command to store the ScriptState data of the page Two comprises:

receiving, by the browser, a command to store a URL and the ScriptState data of the page Two in a linked list that has already stored the URL and the ScriptState data of the page One;

leaving, by the browser, the page Two;

re-opening, by the browser, the page One;

reading, by the browser, information in the linked list to search whether the URL of the page One is included;

if the URL of the page One is included, obtaining the ScriptState data of the page One, configuring the ScriptState data of the page One into the browser through a related interface; and restoring running of the script of the page One; and if the URL of the page One is not included, the linked list is known to include no ScriptState data of the page One, reloading, by the browser, the ScriptState data of the page One, parsing and running the script of the page One.

5. The apparatus according to claim 4, wherein the apparatus is one of following:

a cellphone, a tablet, a notebook, a desktop, an electronic reader, a game console, and a network set-top box.

6. The apparatus according to claim 4, wherein when executed by a processor under computer programs stored in a memory, the device is further configured to:

search whether a URL of a page to be restored is included; and restore ScriptState data of the page to be restored and restore running of script corresponding to the restored ScriptState data of the page.

7. The apparatus according to claim 4, wherein when executed by a processor under computer programs stored in a memory, the device is further configured to:

release the stored ScriptState data.

8. A method for restoring pages of a browser, comprising:

receiving, by the browser, a command to open page One;

receiving, by the browser, a command to store script state (ScriptState) data of the page One, leave the page One, and open page Two; and receiving, by the browser, a command to store ScriptState data of the page Two, leave the page Two, re-open the page One, and restore running of script of the page One, wherein the browser performs:

receiving a command to store a URL and the ScriptState data of the page Two in a linked list that has already stored a URL and the ScriptState data of the page One;

leaving the page Two;

re-opening the page One;

reading information in the linked list to search whether the URL of the page One is included;

if the URL of the page One is included, obtaining the ScriptState data of the page One, configuring the ScriptState data of the page One into the browser through a related interface; and restoring running of the script of the page One; and if the URL of the page One is not included, the linked list is known to include no ScriptState data of the page One, reloading the ScriptState data of the page One, parsing and running the script of the page One.

9. The method according to claim 8, wherein receiving, by the browser, the command to store the ScriptState data of the page One includes:

receiving, by the browser, a command to establish the linked list;

storing the Uniform Resource Locator (URL) and the ScriptState data of the page One in the linked list;

leaving, by the browser, the page One; and opening, by the browser, the page Two.

10. The method according to claim 8, further comprising:

when the number of pages opened by the browser exceeds a preset length of a linked list or the browser has exited, removing, by the linked list, a sign indicating that data has been cached, calling, by the linked list, a released interface, and releasing, by the linked list, the cached data.

* * * * *